United States Patent [19]

Yoshinaka

[11] Patent Number: 5,384,787
[45] Date of Patent: Jan. 24, 1995

[54] PICTURE DATA RECORDING APPARATUS AND PICTURE DATA REPRODUCING APPARATUS

[75] Inventor: Tadaaki Yoshinaka, Kanagawa, Japan

[73] Assignee: Sony Corporation, Tokyo, Japan

[21] Appl. No.: 73,556

[22] Filed: Jun. 9, 1993

[30] Foreign Application Priority Data

Jun. 17, 1992 [JP] Japan .................. 4-181519

[51] Int. Cl.⁶ ............................................ G06F 11/10
[52] U.S. Cl. ..................... 371/37.4; 358/335
[58] Field of Search ............... 371/37.4, 37.5, 37.1, 371/37.7, 40.1, 41, 2.1, 2.2; 360/19.11, 32; 358/336, 341, 343, 335

[56] References Cited

U.S. PATENT DOCUMENTS

| | | | |
|---|---|---|---|
| 4,408,326 | 10/1983 | Takeuchi et al. | 371/37.4 X |
| 4,414,668 | 11/1983 | Iwasaki | 371/37.4 X |
| 4,729,043 | 3/1988 | Worth | 371/37.5 X |
| 4,953,168 | 8/1990 | Odaka | 371/37.4 |
| 4,972,417 | 11/1990 | Sako et al. | 371/37.7 X |

*Primary Examiner*—Joseph Ruggiero
*Attorney, Agent, or Firm*—William S. Frommer; Alvin Sinderbrand

[57] ABSTRACT

In a picture data recording system, a coding processing unit encodes picture data having a quantity of data generated at a different point in time so that its data quantity becomes equal to a predetermined target data quantity at every predetermined field. An error correcting code adding unit adds known data to the picture data coded by the coding processing unit within a correcting ability range by error correcting codes to carry out a parity calculation so as to add an error correcting code to picture data of a predetermined target data quantity. Thus, a recording unit records, onto a recording medium such as a magnetic tape, etc., the picture data having the predetermined target data quantity to which the error correcting code is added by the error correcting code adding unit. In addition, in a picture data reproducing system, a reproducing unit reproduces picture data from the recording medium. Then, an error correcting processing unit adds known data to the picture data having the predetermined target data quantity obtained from the reproducing unit to implement an error correcting processing thereto on the basis of an error correcting code used in the picture data recording system.

7 Claims, 5 Drawing Sheets

PICTURE DATA RECORDING APPARATUS AND PICTURE DATA REPRODUCING APPARATUS

BACKGROUND OF THE INVENTION

1. Field of the Invention

This invention relates to a picture data recording apparatus for recording picture data onto a recording medium such as a magnetic tape or an optical disk, etc. and a picture data reproducing apparatus for reproducing picture data recorded on the recording medium, and more particularly to a picture data recording apparatus and a picture data reproducing apparatus for implementing efficient coding processing to picture data to carry out recording/reproduction of the coded data.

2. Description of the Prior Art

When transmitting picture data, or recording it onto a recording medium, e.g., a magnetic tape, etc., various coding methods for compression of picture information are employed. For example, predictive coding, transform coding, and vector quantization, etc. are known.

Meanwhile, the transform coding utilizes correlation that picture signals have to transform sampled values (hereinafter referred to as picture data) to data on axes perpendicular to each other to allow the correlation between picture data to be lost to carry out reduction of data quantity. As this transform coding system, there is employed an orthogonal transform system in which so called basic vectors are perpendicular to each other, the sum total of mean signal powers which have not undergone transform processing and the sum total of mean powers of so called transform coefficients obtained by orthogonal transform processing are equal to each other, and the power concentration on the low frequency component is excellent. Regarding the orthogonal transform coding, there are known, for example Hadamard Transform, Haar Transform, Karhunen-Loeve (K-L) Transform, Discrete Cosine Transform (hereinafter referred to as DCT), Discrete Sine Transform (hereinafter referred to as DST), and Slant Transform, etc.

Here, the above-mentioned DCT will be briefly described.

In the DCT, a picture (frame) is divided into picture blocks comprised of n pixels disposed in both horizontal and vertical directions, i.e., (n×n) pixels at a spatial arrangement to implement orthogonal transform processing to picture data within the picture blocks by using a cosine function. In this DCT, a high speed operational algorithm exists. Because a LSI of one chip permitting an actual time transform processing of picture data has been realized, such DCT is widely used in transmission or recording of picture data. Further, the DCT processing has, as the coding efficiency, a characteristic substantially equal to that of the above-mentioned K-L transform processing which is an optimum transform processing in respect of the power concentration on the low frequency component which directly affects the efficiency. Accordingly, transform coefficients obtained by the DCT are caused to undergo such a processing to encode only components where powers concentrate, thereby permitting a quantity of information to be reduced to a high degree as a whole.

In a more practical sense, when transform coefficients obtained by implementing DCT processing on picture data are represented with, e.g., $C_{ij}$ ($i=0 \sim n-1$, $j=0 \sim n-1$), the transform coefficient $C_{00}$ corresponds to a d.c. component indicating a mean luminance value within a picture block, and its power ordinarily becomes considerably larger than those of other components. In the case where this d.c. component is coarsely quantized, there is high possibility that there may take place a so called block distortion which is a noise peculiar to the orthogonal transform coding that visually deteriorates the picture quality. For this reason, a greater number of bits are allocated to the transform coefficient $C_{00}$ to equally carry out quantization. On the other hand, for transform coefficients $C_{ij}$ of other components, except for the d.c. component (i.e., except for $C_{00}$), e.g., by making use of the visual characteristic that the visual spatial frequency lowers in a higher frequency band, weighting is carried out so as to quantize those transform coefficients in such a manner that as the frequency shifts to a higher frequency side, the number of bits allocated thereto becomes lesser.

In transmission or recording of picture data, transform coefficients obtained by implementing DCT processing are quantized as described above, and are then caused to undergo variable length coding such as Huffman coding, or Run Length coding, etc. for the purpose of carrying out data compression to add a synchronizing signal and/or parity code, etc. to the coded data thus obtained thereafter to carry out transmission or recording thereof.

Meanwhile, in a video tape recorder adapted for recording a video signal onto a magnetic tape as a digital signal (hereinafter simply referred to as a VTR), it is required to allow a quantity of data of one frame or one field to be fixed (have a fixed length) when editing and/or variable speed reproduction, etc. are taken into consideration. Since a quantity of data generated can be controlled by varying the quantization step width, an approach is employed to vary the quantization step width while calculating a quantity of data generated so that it becomes equal to a predetermined target data quantity.

However, a quantity of data generated diversely changes depending upon a video signal to be handled, so there is no guarantee that all picture data have a data quantity which falls within a predetermined target data quantity, Accordingly, although such data exceeding a predetermined target data quantity are generated at a very low probability in an actual sense, it is necessary to ensure that the recording capacity does not exceed the maximum data quantities of all picture data generated. For this reason, the memory capacity is required to have a remarkable margin. As a result, realization of high density recording of the VTR was hindered.

OBJECT AND SUMMARY OF THE INVENTION

In view of actual circumstances as stated above, this invention has been made, and its object is to provide a picture data recording apparatus and a picture data reproducing apparatus permitting high density recording of picture data to be carried out.

Another object of this invention is to provide a picture data recording apparatus and a picture data reproducing apparatus, which are capable of restoring, by the error correcting processing, picture data having a data quantity more than a predetermined target data quantity, which are generated at a low probability, without recording such picture data.

To achieve the above-mentioned objects, in accordance with one aspect of this invention, there is provided a picture data recording apparatus adapted for converting a picture signal to picture data having a quantity of data generated at a different point in time to implement error correcting coding to the converted picture data and to record it onto a recording medium, which comprises; coding means for coding the picture data having a quantity of data generated different in point of time so that its data quantity is substantially fixed every predetermined field; error correcting code adding means adapted for adding known data to the picture data, coded by the coding means, within a correcting ability range by error correcting codes to carry out a parity calculation and adding the error correcting code to picture data of a predetermined target data quantity; and recording means for recording, onto the recording medium, the picture data of the predetermined target data quantity to which error correcting code is added by the error correcting code adding means.

In the picture data recording apparatus thus featured, the error correcting code adding means may be of a structure for adding an error correcting code in a productive code form. The error correcting code adding means may be comprised of outer code adding means adapted for adding the known data to picture data coded by the coding means within a correcting ability range by an outer code carrying out a parity calculation of outer coding and adding an outer code obtained as the result of the parity calculation only to the picture data of the predetermined target data quantity; and inner code adding means adapted for carrying out a parity calculation of an inner coding with respect to the picture data of the predetermined target data quantity to which the outer code is added by the outer code adding means to add thereto an inner code obtained as the result of this parity calculation.

Further, in the picture data recording apparatus thus featured, the error correcting code adding means may include identification signal adding means adapted for adding, to output picture data of the outer code adding means, an identification signal indicating whether or not a data quantity of the coded picture data is greater than the predetermined target data quantity.

In addition, the picture data recording apparatus thus featured may further comprise: means for orthogonally transforming a picture signal; quantization means for quantizing the orthogonally transformed picture signal with its quantization width being changed to a predetermined value; variable length coding means for implementing variable length coding to output data of the quantization means; and packet data generating means for generating packet data obtained by dividing output data of the variable length coding means every predetermined data quantity, the picture data having a quantity of data generated at a different point in time being obtained from the packet data generating means.

In another aspect of this invention, there is provided a picture data reproducing apparatus adapted for reproducing picture data recorded on a recording medium by a picture data recording apparatus as featured above, which comprises: reproducing means for reproducing picture data recorded on the recording medium; and error correcting processing means adapted for adding known data to picture data of a predetermined target data quantity obtained from the reproducing means to implement an error correcting processing thereto on the basis of an error correcting code used in the picture data recording apparatus.

In the picture data reproducing apparatus thus featured, the error correcting code may take a productive code form, and the error correcting processing means may include: inner code correcting means adapted for carrying out an error correcting processing of the picture data by an inner code added to the picture data of the predetermined target data quantity obtained from the reproducing means; and outer code correcting means adapted for adding the known data, within a correcting ability range of the error correcting code in the productive code form, to the picture data of the predetermined target data quantity obtained as an output of the inner code correcting means, thus to carry out error correction of the picture data by the outer code included in an output of the inner code correcting means.

In the reproducing apparatus thus featured, the error correcting means may include identification signal detecting means for detecting an identification signal indicating whether or not a data quantity of picture data are coded so that the data quantity is substantially fixed every predetermined field by the picture data recording apparatus, which is included in an output of the reproducing means, is greater than the predetermined target data quantity. Further, the outer code correcting means is adapted to add the known data to output data of the inner code correcting means on the basis of the identification signal.

Other objects, and the configuration and advantages-/effects of this invention will become more apparent from the following description with reference to the attached drawings.

DESCRIPTION OF THE PREFERRED EMBODIMENT

A preferred embodiment of a picture data recording apparatus and a picture data reproducing apparatus according to this invention will now be described in detail with reference to the attached drawings.

Figure 1:
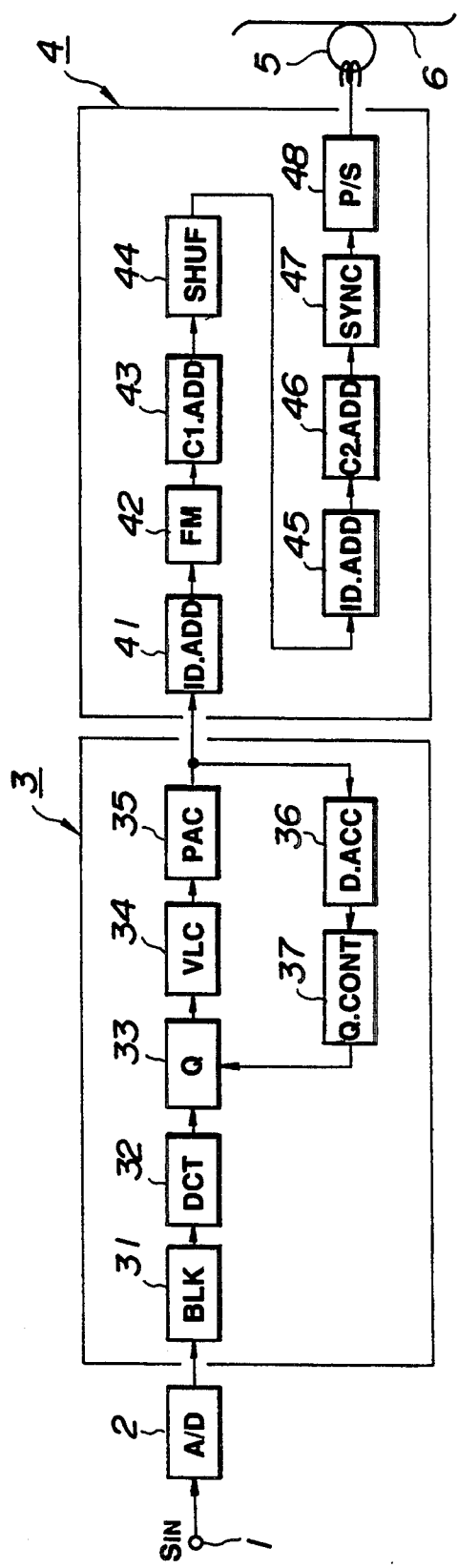
FIG. 1 is a block diagram showing a circuit configuration of a picture data recording apparatus according to this invention.

A picture data recording apparatus according to this invention is constituted as shown in FIG. 1, for example.

The picture data recording apparatus of this embodiment is directed to a recording system of a digital video tape recorder (VTR) to which this invention is applied. This recording system includes an A/D converter 2 supplied with an input video signal $S_{IN}$ through a signal input terminal 1, a coding processing unit 3 supplied with picture data digitized by the A/D converter 2, and a recording data processing unit 4 supplied with a coded output by the coding processing unit 3, etc. to deliver recording data obtained by the recording data processing unit 4 to a magnetic head 5 to record it onto a magnetic tape 6.

More particularly, the A/D converter 2 samples an input video signal $S_{IN}$ delivered through the signal input terminal 1 by a sampling clock of a sampling frequency of fs to digitize it to thereby form picture data to deliver this picture data to the coding processing unit 3.

Further, the coding processing unit 3 includes a block data generating unit 31 supplied with picture data from the A/D converter 2, an orthogonal transform element 32 supplied with picture data every block from the block data generation unit 31, a quantizer 33 supplied with picture data orthogonally transformed by the orthogonal transform element 32, a variable length encoder 34 supplied with picture data quantized by the quantizer 33, a packet data generating circuit 35 supplied with picture data which has been subjected to variable length coding by the variable length encoder 34, a data quantity counter 36 supplied with picture data caused to be packet data from the packet data generating circuit 35, and a quantization step controller 37 supplied with a count output by the data quantity counter 36, thus to control the quantization step width of the quantizer 33 by the quantization step controller 37.

Figure 2:
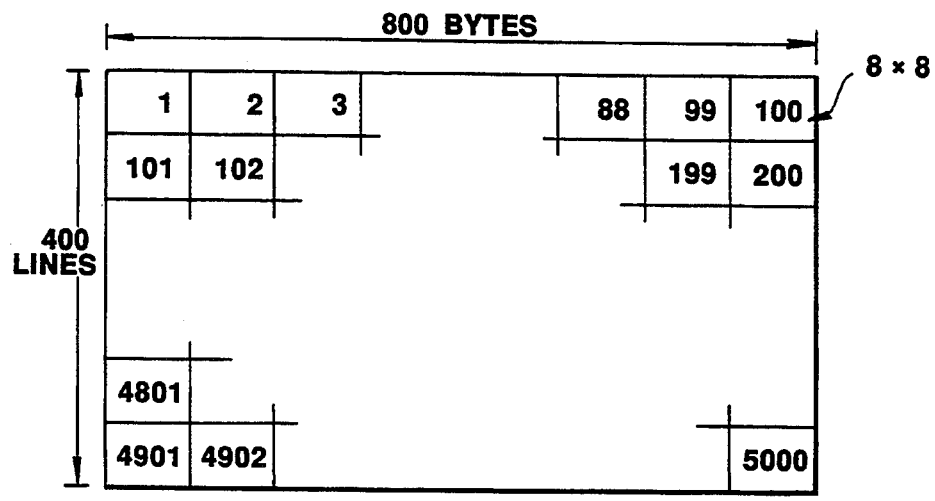
FIG. 2 is a view showing, in a model form, picture data written into a frame memory of a coding processing unit of the above-mentioned picture data recording apparatus.

The block data generation unit 31 comprises a frame memory, and serves to divide picture data of one frame into picture data every block of 8×8 pixels, as shown in FIG. 2, for example, with respect to picture data delivered from the A/D converter 2 to output picture data to which shuffling processing is implemented.

Picture data in each of the respective picture blocks outputted from the block data generation unit 31 is subjected to, for example, DCT processing by the orthogonal transform element 32 so that it is dissolved into 8×8 frequency components. The picture data which has been subjected to DCT processing by the orthogonal transform element 32 (DCT coefficient data) is requantized by a bit allocation in accordance with a power distribution by the quantizer 33. The picture data re-quantized by the quantizer 33 (quantized data) is subjected to variable length coding by the variable length encoder 34, and is then converted to data every packet of 8 bits by the packet data generation circuit 35.

The data quantity counter 36 counts, every 100 blocks, the data quantity of packet data supplied from the packet data generating circuit 35 (variable length coded data), i.e., a quantity of generated picture data by the coding processing unit 3. Then, the quantization step controller 37 makes a comparison between a quantity of data generated every 100 blocks indicated by a count output by the data quantity counter 36 and a predetermined target data quantity to control the quantization step width of the quantizer 33 so that a quantity of data generated every 100 blocks becomes close to the predetermined target data quantity.

Thus, the coding processing unit 3 compresses picture data of 800×400 bytes/frames to, e.g., one fourth thereof to deliver, to the recording data processing unit 4, picture data (variable length coded data) of the predetermined target data quantity (800×400)/4=80000 bytes/frames (1600×50 bytes/frames). It is to be noted that with respect to picture data obtained by the coding processing unit 3, there is no guarantee that each quantity of data generated every 100 blocks falls within the predetermined target data quantity, and there are therefore instances where a quantity of data of one frame may exceed the predetermined target data quantity (1600×50 bytes/frames). Namely, in the picture data recording apparatus of this embodiment, the coding processing unit 3 encodes picture data having a quantity of data generated at a different point in time so that its data quantity becomes equal to the predetermined target data quantity (1600×50 bytes/frames) every one frame.

Further, the recording data processing unit 4 comprises an ID adding circuit 41, a frame memory 42, an outer code adding circuit 43, a shuffling circuit 44, a SYNC/ID adding circuit 45, an inner code adding circuit 46, a SYNC/ID adding circuit 47, and a PS converter 48, etc.

Figure 3:
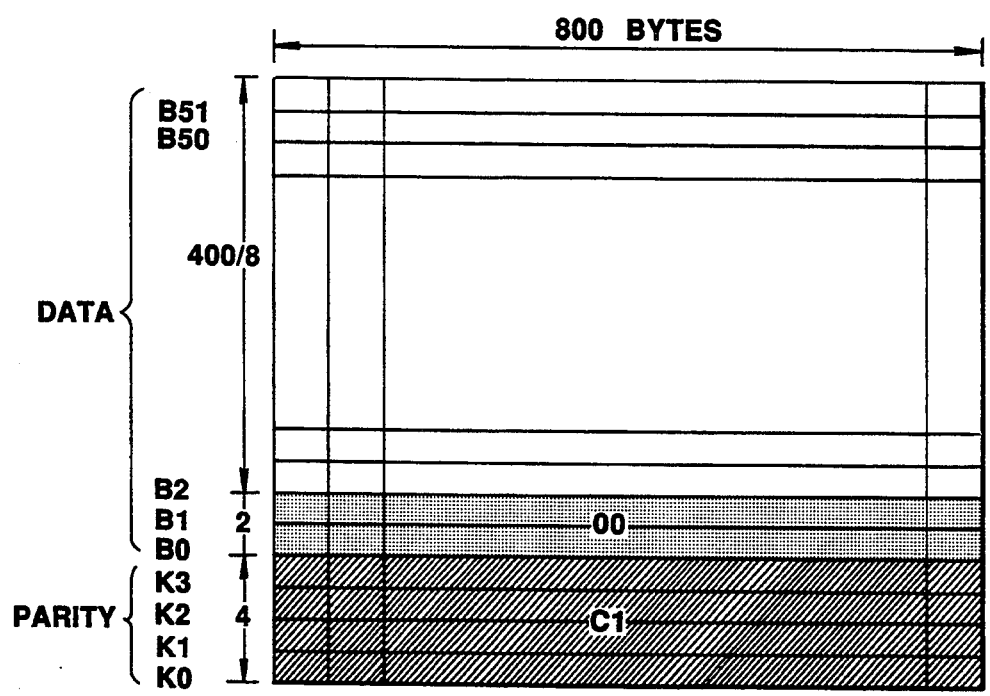
FIG. 3 is a view showing, in a model form, picture data to which an outer code is added in a recording data processing unit of the above-mentioned picture data recording apparatus.

In this recording data processing unit 4, the ID adding circuit 41 is supplied with picture data coded by the coding processing unit 3 and an identification code (ID) indicating its quantization step width is included in the ID signal added to the picture data. In the frame memory 42, picture data of one frame in which the identification code (ID) is added, by the ID adding circuit 41, is written. FIG. 3 illustrates a video interval, formed in the frame memory 42, which includes the picture data B2–B51 representing a field or frame, margin regions B0–B1 and parity regions K0–K3. As shown in FIG. 3, this frame memory 42, which as stated above is provided with margin regions B1, B0 of 1600×2 bytes with respect to data regions B51~B2 of the predetermined target data quantity (1600×50 bytes/frames). Picture data coded by the coding processing unit 3 are recorded as far as the region including the margin regions B1, B0 in such a manner that known dummy data (00 or FF, etc.) is added. It is to be noted that writing into the frame memory 42 is carried out in a row direction of FIG. 3.

Further, the outer code adding circuit 43 reads out, in a vertical direction (in the column direction of FIG. 3), from the frame memory 42, picture data of one frame in which known dummy data (00 or FF, etc.) which is added in the margin regions B0, B1 to calculate parity codes K3, K2, K1, K0 and allows them to be an outer code C1 for error correction. Namely, in the case where picture data of one frame coded by the coding processing unit 3 falls within the data regions B51~B2 of the predetermined target data quantity (1600×50 bytes/frames), the outer code adding circuit 43 calculates an outer code C1 for error correction with known dummy data (00 or FF, etc.) being inserted into the margin regions B1, B0. In contrast, in the case where the picture data of one frame overflows as far as the margin regions B1, B0, the outer code adding circuit 43 calculates an outer code C1 for error correction so as to include data caused to overflow.

Further, the shuffling circuit 44 implements shuffling processing to picture data of one frame in which outer code C1 for error correction is added by the outer code adding circuit 43. Then, the SYNC/ID adding circuit 45 adds, to the picture data to which the shuffling processing has been implemented by the shuffling circuit 44, every inner code block (160 data + 8 parity codes), a synchronizing signal (SYNC) and an identification code (ID) indicating whether or not corresponding data is data of the predetermined target data quantity (1600×50 bytes/frames).

Figure 4:
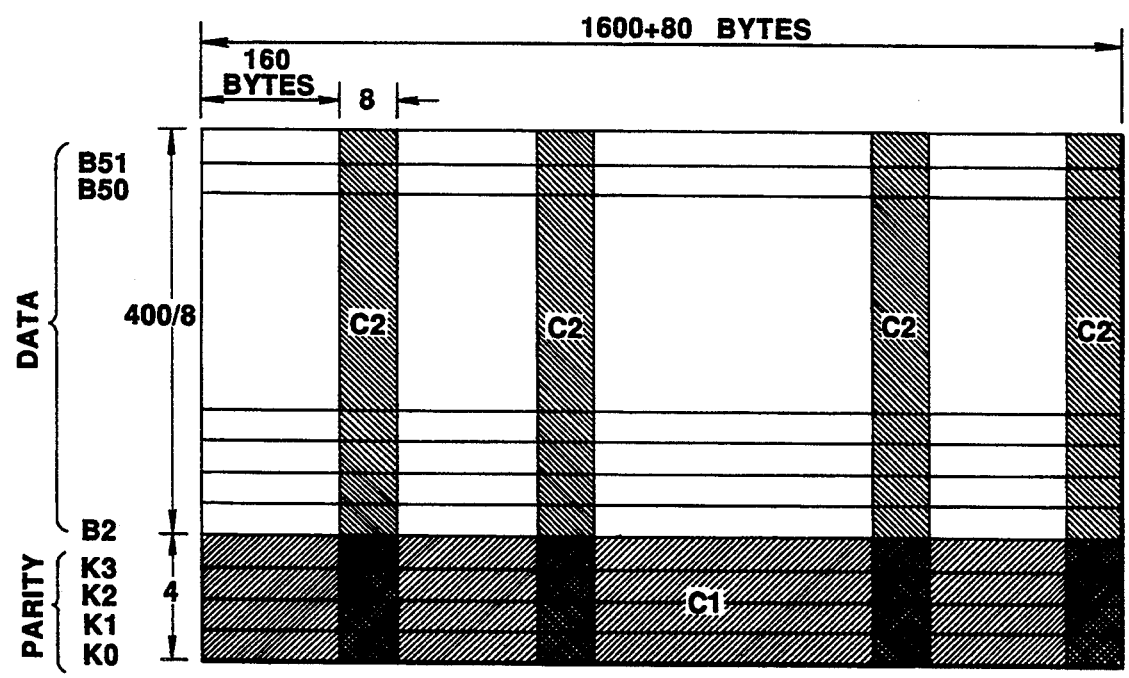
FIG. 4 is a view showing, in a model form, picture data to which an outer code and an inner code are added in the recording data processing unit of the above-mentioned picture data recording apparatus.

Then, the inner code adding circuit 46 calculates a parity in a horizontal direction with respect to picture data to which the synchronizing signal (SYNC) and the identification code (ID) are added by the SYNC/ID adding circuit 45 to add an inner code C2 for error correction to picture data in the data regions B51~B2 except for the margin regions B1, B0 as shown in FIG. 4, i.e., picture data of the predetermined target data quantity (1600×50 bytes/frames). Further, a synchronizing signal (SYNC) and identification information (ID) indicating the picture block number are added in every SYNC block, by the SYNC/ID adding circuit 47, to the picture data of which the inner code C2 is added by the inner code adding circuit 46. The P/S converter 48 converts picture data, etc. delivered as parallel data of 8 bits from the SYNC/ID adding circuit 47, to serial data and outputs it as recording data.

Namely, in the picture data recording apparatus of this embodiment, the recording data processing unit 4 adds known data within a correcting ability range by error correcting codes C1, C2 with respect to picture data coded by the coding processing unit 3 to carry out a parity calculation, so as to output recording data in which error correcting codes C1, C2 are added to the picture data of the predetermined target data quantity (1600×50 bytes/frames).

The recording data outputted from the P/S converter 48 of the recording data processing unit 4 is recorded onto the magnetic tape 6 by the magnetic head 5.

In the picture data recording apparatus of this embodiment, the inner code C2 added to picture data by the inner code adding circuit 46 can be used in the reproducing system mainly for correction of random error and raising or setting an error pointer, Further, the outer code C1 added to picture data by the outer code adding circuit 43 can be used in the reproducing system for carrying out eraser correction of a burst error by using the pointer of the inner code C2. In the picture data recording apparatus of this embodiment, since four parity codes K0, K1, K2, K3 are added to picture data as the outer code C1, four error corrections can be made in the longitudinal data series. Namely, correcting ability of four errors can be obtained with respect to picture data having a data quantity which falls within the predetermined target data quantity (1600×50 bytes /frames). In addition, picture data in the data regions B51~B2 above the predetermined target data quantity (1600×50 bytes/frames) can be restored by the error correcting processing in the reproducing system having correcting ability of four errors.

As stated above, in the recording data processing unit 4, the margin regions B1, B0 are provided to add calculated error correction codes C1, C2 to picture data of the predetermined target data quantity (1600×50 bytes/frames) to allow the picture data thus obtained to be actual memory data. As a result, there is no necessity of recording picture data in the margin regions B1, B0 on the magnetic tape 6. Thus, high density recording can be realized.

Figure 5:
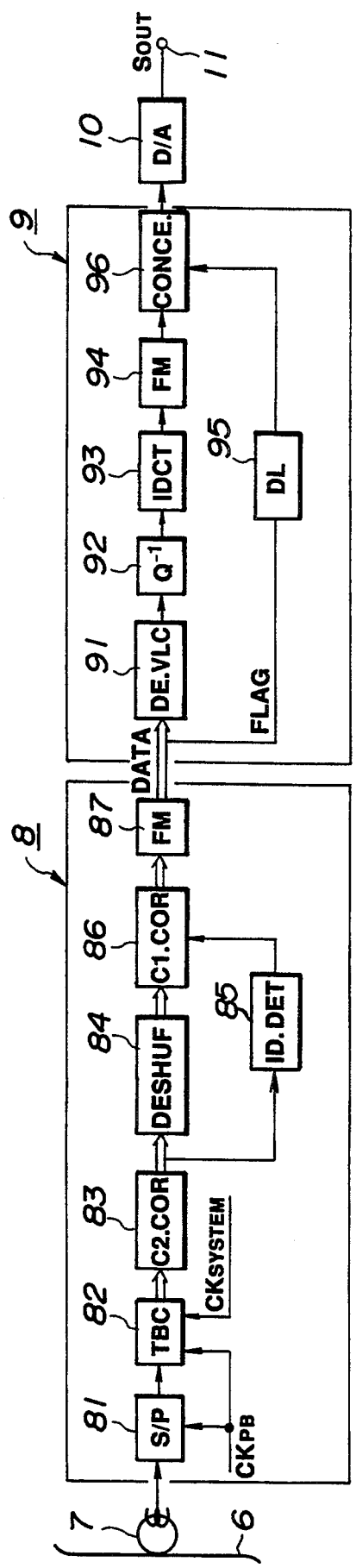
FIG. 5 is a block diagram showing a circuit configuration of a picture data reproducing apparatus according to this invention.

A picture data reproducing apparatus according to this invention is constituted as shown in FIG. 5, for example.

The picture data reproducing apparatus of this embodiment is directed to a reproducing system of the digital video tape recorder (VTR) to which this invention has been applied. This reproducing system comprises a magnetic head 7 for tracing recording tracks of the magnetic tape 6 on which picture data is recorded by the picture data recording apparatus according to this invention, a reproduced data processing unit 8 connected to the magnetic head 7, a decoding processing unit 9 supplied with a reproduced output by the reproduced data processing unit 8, and a D/A converter 10 supplied with a decoded output by the decoding processing unit 9, etc. to convert the decoded output by the decoding processing unit 9 to a corresponding analog signal by the D/A converter 10 to output a reproduced video signal $S_{OUT}$ from a signal output terminal 11.

More particularly, the magnetic head 7 traces recording tracks of the magnetic tape 6 to thereby provide a reproduced signal of picture data to deliver this reproduced signal to the reproduced data processing unit 8.

The reproduced data processing unit 8 serves to carry out data processing corresponding to the recording data processing unit 4 in the above-described recording system with respect to a reproduced signal of the picture data obtained by the magnetic head 7, and includes a S/P converter 81, a TBC circuit 82, an inner code correcting circuit 83, a de-shuffling circuit 84, an ID detector 85, an outer code correcting circuit 86, and a frame memory 87, etc.

In this reproduced data processing unit 8, the S/P converter 81 converts a reproduced signal obtained by the magnetic head 7 from serial data to parallel data of 8 bits. The TBC circuit 82 includes a frame memory into which picture data converted to parallel data by the S/P converter 81 is written by a reproducing clock, and adapted for reading out picture data from the frame memory by a system clock to thereby implement time base corrective processing to the picture data.

Further, the inner code correcting circuit 83 carries out corrective processing of random error by using the inner code C2 and carries out a processing for raising or setting an error pointer with respect to picture data to which the time base corrective processing has been implemented by the TBC circuit 82. In addition, the de-shuffling circuit 84 implements de-shuffling processing corresponding to the shuffling circuit 84 of the above-described recording system with respect to picture data to which the error correction processing has been implemented by the inner code correction circuit 83.

Further, the ID detection circuit 85 detects an identification code (ID) indicating whether or not picture data to which the error correction processing has been implemented by the inner code correction circuit 83 is data having a data quantity which falls within the above-described predetermined target data quantity (1600×50 bytes/frames).

The outer code correcting circuit 86 carries out an eraser correction of a burst error by the outer code C1 by using an error pointer by the inner code C2 with respect to the picture data to which the de-shuffling processing has been implemented by the de-shuffling circuit 84.

Figure 6:
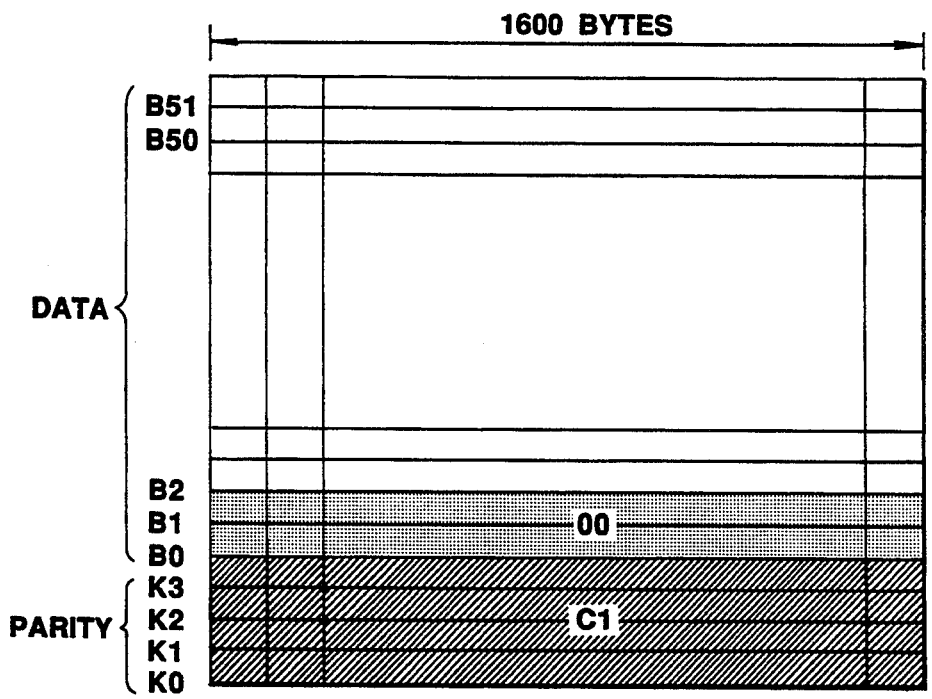
FIG. 6 is a view showing, in a model view, picture data written into a frame memory of a reproduced data processing unit of the above-mentioned picture data reproducing apparatus.
Figure 7:
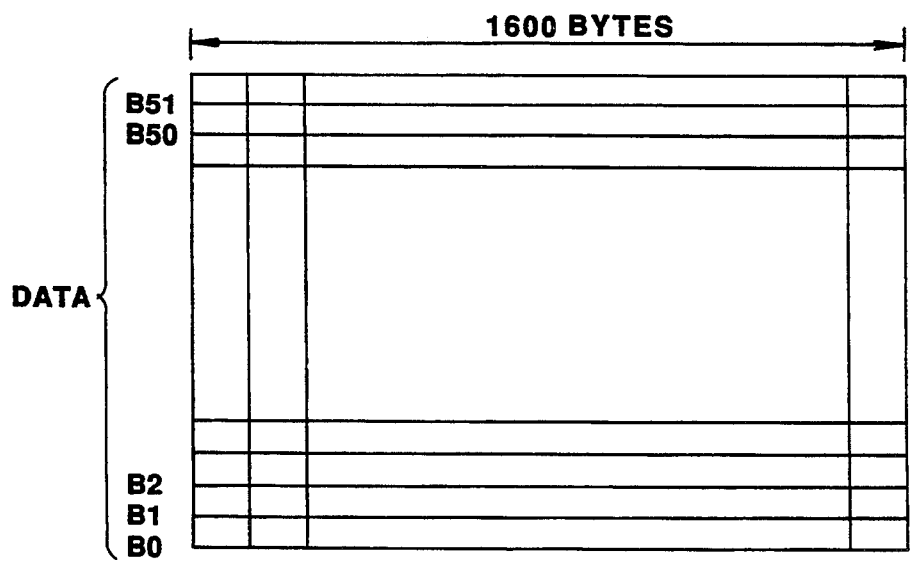
FIG. 7 is a view showing, in a model form, picture data reproduced in the frame memory of the reproduced data processing unit of the above-mentioned picture data reproducing apparatus.

In this embodiment, the outer code correcting circuit 86 judges, on the basis of an identification code (ID)

detected by the ID detection circuit 85, whether or not the picture data to which the de-shuffling processing has been implemented by the de-shuffling circuit 84 is data having a data quantity which falls within the above-described predetermined target data quantity (1600×50 bytes/frames). Then, the outer code correction circuit 86 inserts known dummy data, as picture data in the above-described margin regions B1, B0, as shown in FIG. 6, into the picture data having a data quantity which falls within the predetermined target data quantity (1600×50 bytes/frames) to carry out an eraser correction of a burst error by the outer code C1 by using an error pointer by the inner code C2. On the other hand, with respect to picture data having a data quantity above the predetermined target data quantity (1600×50 bytes/frames), the outer code correction circuit 86 raises or sets a pointer in the picture data in the above-described margin regions B1, B0 to carry out eraser correction by the outer code C1 to thereby restore picture data in the margin regions B1, B0 as shown in FIG. 7.

It is to be noted that, in the outer code correction circuit 86, an approach may be employed without carrying out eraser correction to insert known dummy data as picture data in the above-described margin regions B1, B0 to perform calculation of the outer code correction at all times. In this case, the ID detecting circuit 85 is unnecessary.

Then, picture data of one frame to which the error correcting processing has been implemented by the outer code correction circuit 86 is delivered to the decoding processing unit 9 through the frame memory 87.

This decoding processing unit 9 serves to carry out decoding processing corresponding to the coding processing unit 3 in the above-described recording system with respect to reproduced picture data provided by the reproduced data processing circuit 8, and comprises a variable length decoder 91, an inverse quantizer 92, an inverse orthogonal transform element 93, a frame memory 94, a delay circuit 95, and a correction processing circuit 96, etc.

In this decoding processing unit 9, the variable length decoder 91 implements variable length decoding processing to reproduced picture data (variable length coded data) provided by the reproduced data processing circuit 8. Moreover, the inverse quantizer 92 implements inverse quantization processing to picture data (quantized data) obtained by the variable length decoder 91. Further, the inverse orthogonal transform element. 93 implements inverse orthogonal transform processing to picture data (DCT coefficient data) obtained by the inverse quantizer 92. In addition, the frame memory 94 is adapted so that picture data obtained by the inverse quantizer 92 are written thereinto in sequence.

The correction processing circuit 96 carries out interpolation processing by using picture data free from neighboring error on the basis of an error flag EF delivered from the reproduced data processing unit 8 with respect to picture data written into the frame memory 94 to thereby correct picture data which could not, be subjected to error correct, ion in the reproduced data processing unit 8. This correction processing circuit 96 delivers error-corrected picture data to the D/A converter 10.

The D/A converter 10 converts the error corrected picture data delivered from the correction processing circuit 96 to a corresponding analog signal to output it, as a reproduced video signal $S_{OUT}$ from the signal output terminal 11.

As stated above, in the picture data reproducing apparatus of this embodiment, picture data in the margin regions B1, B0 can be restored by the error correction processing by the outer code C1 in the outer code correction processing circuit 86 of the reproduced data processing unit 8 with respect to picture data of which data quantity is above the predetermined target data quantity (1600×50 bytes/frames), In addition, there is no possibility that the error correcting ability for picture data of which data quantity fails within the predetermined target data quantity (1600×50 bytes/frames) is lowered.

As described above, in accordance with the picture data recording apparatus according to this invention, picture data having a quantity of data generated at a different point in time is coded by the coding means so that its data quantity is substantially fixed every predetermined field, By the error correcting code adding means, known data is added to the picture data coded by the coding means within a correcting ability range by error correcting codes. Then, parity calculation is carried out to add an error correcting code to picture data having a predetermined target data quantity. Thus, picture data within a correcting ability by the error correction code can be restored in the reproducing system, In addition, the recording means records, onto a recording medium, only picture data of the predetermined target data quantity to which an error correcting code is added by the error correcting code adding means. In this instance, the recording means does not record thereon picture data having a data quantity is above the predetermined target data quantity. Thus, high density recording of picture data can be realized.

Further, in accordance with the picture data reproducing apparatus, picture data recorded on a recording medium is reproduced by the reproducing means. By error correcting processing means, known data is added to picture data of a predetermined target data quantity obtained from the reproducing means to implement an error correcting processing on the basis of an error correcting code used in the picture data recording apparatus. Thus, picture data of which data quantity is above the predetermined target data quantity can be restored by the error correcting processing by the error correcting processing means. In addition, there is no possibility that the error correcting ability of the error correcting processing means for picture data of which data quantity falls within the predetermined target data quantity is lowered.

Accordingly, in accordance with this invention, it is possible to provide a picture data recording apparatus and a picture data reproducing apparatus which can restore, by the error correcting processing, picture data having a data quantity above the predetermined target data quantity, which are generated at a low probability, without recording such picture data. Thus, high density recording of picture data can be carried out.

While the present invention has been pictorially shown and described with reference to preferred embodiments thereof, it will be appreciated by those of ordinary skill in the art that various changes and modifications may be made without departing from the spirit and scope of the invention. It is intended that the appended claims be interpreted as including the embodiments described herein, the alternatives mentioned above and all equivalents thereto.

What is claimed is:

1. A picture data recording apparatus for converting a picture signal to picture data comprising a video interval of successive data blocks, the data blocks of said video interval having a quantity of picture data substantially equal to a predetermined target quantity but which may be less than or may exceed said predetermined target quantity, said apparatus comprising:

coding means for coding said successive data blocks to produce corresponding coded data blocks so that said video interval of data blocks has a quantity of picture data approximately equal to said predetermined target quantity;

error correcting code adding means for adding known data to said video interval having a quantity of picture data in said coded data blocks which is less than or equal to said predetermined target quantity, and for adding error correcting data to said video interval having a quantity of picture data in said coded data blocks which exceeds said predetermined target quantity to carry out a parity calculation; and recording means for recording, onto said recording medium, each video interval of coded data blocks including said error correcting data but not including excess picture data in the video interval of data blocks that has a quantity of picture data that exceeds said predetermined target quantity.

2. A picture data recording apparatus for converting a picture signal to picture data comprising a video interval of successive data blocks, the data blocks of said video interval having a quantity of picture data substantially equal to a predetermined target quantity but which may be less than or may exceed said predetermined target quantity, said apparatus comprising:

coding means for coding said successive data blocks to produce corresponding coded data blocks so that said video interval of data blocks has a quantity of picture data approximately equal to said predetermined target quantity;

error correcting code adding means including outer code adding means for selectively adding an outer error correcting code and known data to said video interval having a quantity of picture data in said coded data blocks which is less than or equal to said predetermined target quantity, said outer error correcting code serving to carry out a parity calculation of outer coding, and including inner code adding means for selectively adding inner error correcting code data to said video interval for carrying out a parity calculation of an inner coding; and recording means for recording onto said recording medium, each video interval of coded data blocks including said inner and outer error correcting code data.

3. A picture data recording apparatus as set forth in claim 2, wherein said error correcting code adding means further includes identification signal adding means for adding, to the picture data included in said video interval of coded data blocks, an identification signal indicating whether or not the quantity of picture data in said coded data blocks exceeds the predetermined target data quantity.

4. A picture data recording apparatus as set forth in claim 2, further comprising:

means for orthogonally transforming each of said successive data blocks;

quantization means for quantizing each orthogonally transformed data block with a quantization width selected with a predetermined value;

variable length coding means for variable length coding each quantized data block; and packet data generating means for generating packet data obtained by dividing each variable length coded data block by a predetermined amount.

5. A picture data recording and reproducing apparatus the recording apparatus comprising:

means for converting a picture signal to picture data comprising a video interval of successive data blocks, the data blocks of said video interval having a quantity of picture data substantially equal to a predetermined target quantity but which may be less than said predetermined target quantity, coding means for coding said successive data blocks to produce corresponding coded data blocks so that said video interval of data blocks has a quantity of picture data approximately equal to said predetermined target quantity, error correcting code adding means for selectively adding known data to said video interval so that said video interval has a quantity of picture data which is less than or equal to said predetermined target quantity, said known data having error correcting codes for carrying out a parity calculation, recording means for recording, onto said recording medium, each video interval of data blocks including said known data; and said reproducing apparatus comprising:

reproducing means for reproducing each video interval of data blocks recorded on said recording medium, and error correcting processing means for selectively adding known data to said video interval of data blocks for error correction processing.

6. A picture data recording and reproducing apparatus as set forth in claim 5, wherein each said error correcting code takes a productive code form, and said error correcting processing means includes:

inner code correcting means for carrying out an inner code error correction of said video interval of data blocks; and outer code correcting means for adding the known data to the inner code error corrected video interval of data blocks and for carrying out outer code error correction of said inner code error corrected data blocks.

7. A picture data recording and reproducing apparatus as set forth in claim 6, wherein said error correcting processing means further includes identification signal detecting means for detecting an identification signal in said reproduced video interval of data blocks indicating whether or not the quantity of picture data in said reproduced video interval exceeds the predetermined target data quantity, and wherein said outer code correcting means selectively adds the known data to the inner code error corrected video interval on the basis of the detected identification signal indicating that the quantity of picture data in said reproduced video interval does not exceed said predetermined target data quantity.

* * * * *